3,148,159
PROCESS OF ACID ACTIVATING MINERAL CLAYS
John A. Hodgkiss, Old Bridge, N.J., assignor to General Aniline & Film Corporation, New York, N.Y., a corporation of Delaware
No Drawing. Filed Mar. 20, 1962, Ser. No. 181,195
7 Claims. (Cl. 252—450)

This invention relates to a process of acid activating a mineral clay of the alumina-silica type in the presence of a phenolic compound.

It is well known that clays of the bentonite type are first activated by treatment with mineral acids such as hydrochloric, sulfuric, etc., under one or more steps of varying conditions of temperature, etc., to produce bleaching earths and active catalyst materials for cracking high boiling liquid hydrocarbons, for polymerization of olefins, and in the alkylation of phenolic compounds. In substantially all of the known activation processes, i.e., acid treatment, the mineral acid is added to an aqueous suspension of clay or diluted mineral acid added directly to the raw or dried clay and the bleaching conducted at various temperatures.

Bentonite clay, of which the usually characteristic mineral is montmorillonite, is essentially a hydrated aluminosilicate and has the composition:

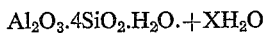
$$Al_2O_3.4SiO_2.H_2O.+XH_2O$$

Many clays which contain montmorillonite type minerals have been termed bentonite. These clays have a definite microcrystalline structure in which magnesium, aluminum and silicon form a part of the crystal lattice, and in the interplanar areas between the lattices—in addition to a variable amount of water—there are present alkali metals such as calcium, magnesium, etc., which are associated with the lattice in an ionic or base exchange relationship. X-ray analyses have established the structural similarities and it is now known that extensive substitution and replacement can take place within the lattice.

The process of activating bentonite clay generally involves the removal of detrital impurities such as the carbonates of magnesium, calcium and iron, as well as other impurities which are present in varying amounts; the base-exchange ions; the lattice water; a part of the lattice magnesium; a part of the lattice aluminum, and little if any of the lattice silicon. It appears that the catalytic activity of a bentonite clay is not greatly developed until the crystal lattice is affected.

The acid activation, or acid pre-treatment, is usually effected by, but not necessarily restricted to, known processes such as are employed in the manufacture of decolorizing clays. Normally, the acid treatment (cold) is carried out on the mineral montmorillonite (bentonite), in finely divided form while the mineral clay is suspended in water in the form of a slurry to which mineral acid such as hydrochloric or sulfuric acid is added or dilute mineral acid added directly to the finely divided mineral clay. In either case, the weight ratio of cold acid to dry mineral clay may vary from about 20 to 100% based on the anhydrous basis, but preferably the ratio is in the order of 30-40%. The mixture of the mineral clay and acid is heated to about 160 to 210° F. for a period of time ranging from 2 to 12 hours and thereafter water washed and filtered. Acid treatments of montmorillonite types of clay are described in United States Patents 1,397,113; 1,579,326; 1,642,871; 2,470,872; 2,472,489; 2,484,828; 2,553,239; and many others too numerous to mention, all of which are known to those skilled in the art. The acid treated clay, after drying in any known or desired manner, is then formed into aggregate masses such as by granulating, powdering, molding, extruding, and the like, and utilized as catalysts in the conversion of hydrocarbon oils and in alkylation of phenols with olefinic hydrocarbons.

Activation of natural mineral products including clays of the kaolin as well as those of the montmorillonite class with concentrated sulfuric acid is also known in which the raw clay is mixed with the acid followed by aging at elevated temperature to complete the sulfation reaction. The sulfated clay is then mixed with water to effect dissolution of the soluble sulfates. It has also been proposed to subject the sulfated clays to thermal decomposition at temperatures in excess of 1100° F. followed by acid solvent treatment to remove alumina and other acid components leaving a residue composed substantially of silica. In lieu of the acid solvent treatment, the sulfated clay may be subjected to treatment at elevated temperatures in the presence of reducing agents or organic hydroxy compounds miscible with sulfuric acid to effect decomposition of the metal sulfates and drive off the oxides of sulfur and other volatiles that may be present.

It is the principal object of the present invention to provide a simplified process whereby any raw clay of the silica-alumina type is activated with a mineral acid in the presence of a phenolic compound of from 6 to 25 carbon atoms to form the desired catalyst after a suitable period of contact and the catalyst employed in the alkylation of the phenolic compound without the necessity of separating and drying the catalyst and recovering the phenolic compound.

Other objects and advantages will be more clearly evident from the following description.

I have discovered that raw clays of the silica-alumina type, i.e. bentonite, montmorillonite, synthetic absorbent composits of silica-alumina, fuller's earth and all of the other similar clays, commercially available under various brand names are readily, efficiently, and economically transformed into active clay catalysts by treating the clay with a mineral acid in the presence of a phenolic compound of from 6 to 25 carbon atoms at a temperature ranging from ambient to 190° C. After a suitable period of contact ranging from ½ to 5 hours, the catalyst formed is allowed to remain in the suspension of the phenolic compound and employed directly in the alkylation of the phenolic compound by the addition of an alkene hydrocarbon, i.e. an olefinic hydrocarbon of from 2 to 18 carbon atoms without the necessity of separating and drying the catalyst and recovering the phenolic compound. In other words, the acid activated catalyst in suspension of the phenolic compound is employed directly in the alkylation of the phenolic compound in accordance with conventional procedure to give a substantially high yield of the alkylated phenol. As a matter of fact, the resulting acid treated clay, in suspension of the phenolic compound, shows alkylating ability superior to commercially available acid-activated mineral clay catalysts. Upon isolation, the clay serves as a catalyst for the polymerization of olefins such as butene, octene, nonene, dodecene, and the like to higher molecular weight polyolefins.

For the purpose of the present invention, I prefer to use raw clay of the silica-alumina type, the analysis of which, calculated on the volatile free basis, shows the following constituents.

| | | Percent |
|---|---|---|
| Silica (SiO$_2$) | From | 60–74.0 |
| Aluminum oxide (Al$_2$O$_3$) | From | 12–22 |
| Feric oxide (Fe$_2$O$_3$) | From | 1.5– 5.0 |
| Magnesium oxide (MgO) | From | 1.0– 7.0 |
| Calcium oxide (CaO) | From | 0.25– 3.0 |

Raw clays which conform to the foregoing analysis are commercially available and are obtained under several brand names such as, for example, Pikes Peak (montmorillonite clay), subbentonite from Cheto Mine in Arizona, Wyo-Ben from Wyoming Bentonite, Aquagel from Baroid Div. of Nat. Lead, Volclay from American Colloid Co., Panther Creek Bentonite from American Colloid Co., etc.

Suitable phenolic compounds which can be employed as media to produce the acid activated catalyst include phenol, o-, m-, and p-cresol, 2,4-xylenol, thymol, α-, and β-naphthol, 5-anthrol, 2-pyrocatechol, resorcinol, pyrogallol, phloroglucinol, 1,2-dihydroxy naphthalene, tertiary butyl phenol; 2,4,6-tributyly phenol, octyl phenol, nonyl phenol, dodecyl phenol, octadecyl phenol, diisobutyl cresol, p-chloro phenol, pentadecyl 2-naphthol, and the like. It is to be noted that any phenolic compound, either unsubstituted or substituted with alkyl groups, may be employed, the only restriction imposed being that the phenolic compound, whether substituted or unsubstituted, be free from basic groups which would interfere with the acid activation.

The process of the present invention is particularly unique and commercially useful in that the medium used for the activation of the catalyst, i.e. the phenolic compound can be identical with the end product for which the catalyst is used to prepare. For example, the raw clay can be activated with a mineral acid in the presence of a specified alkylated phenol having 2 to 18 carbon atoms in the alkyl chain, and the resulting catalyst slurry mixture, after acid activation, added to a mixture of an olefinic hydrocarbon of from 2 to 18 carbon atoms and a phenolic compound or vice versa, the catalyst mixture being employed to catalyze the reaction to the same, or a dissimilar, alkylated phenol. The savings in time, labor, equipment, and drying involved in the preparation of an activated clay catalyst by a separate procedure will be quite evident from illustrative examples given hereinafter.

The alkene hydrocarbons, i.e. olefinic hydrocarbons of 2 to 18 carbon atoms, which may be employed in the alkylation of the phenolic compounds present in the catalyst mixture, after acid activation, are illustrated by the following: propylene, dipropylene, butylene, isobutylene, diisobutylene, pentene, heptene, octene, nonene, decene, undecene, dodecene, octadecene, and the like.

In preparing the acid activated clay catalyst of the present invention, the raw clay is mixed with the phenolic compound with good agitation until a uniform mixture is obtained. The mixture may be prepared in any conventional vessel equipped with agitator, heating provisions (for certain mixtures), and a thermometer. The heat may be supplied by external sources, such as hot water pipes, steam pipes or electrical resistors. The temperature during agitation may range from ambient temperature up to 190° C. At temperatures above ambient, i.e. from about 43 to about 200° C., practically all of the phenolic compounds, substituted and unsubstituted, will melt or approach their melting point. For the purpose of the present invention I prefer, however, to operate at a temperature in the range from 25 to 125° C. The pressure may be atmospheric, sub-atmospheric, or super-atmospheric. Atmospheric pressure, however, is preferred.

The proportion of the raw clay of the silicon-alumina type may vary from 5 to 100 parts by weight per 100 parts of the phenolic compound. It is preferred, however, to employ from 10 to 50 parts by weight of the raw clay of the silica-alumina type with 100 parts by weight of the phenolic compound. The mineral acid may vary from 4 to 20 parts by weight per 100 parts by weight of the raw clay. The mineral acid may be either hydrochloric, sulfuric, phosphoric, nitric, or mixtures thereof. In lieu of the mineral acids I may employ strong acids such as, for example, trichloroacetic, dichloroacetic, tribromoacetic, trifluoroacetic, triiodoacetic, diiodoacetic, benzenesulfonic acid, xylenedisulfonic acid, etc.

The weight ratio of the mineral acid, mixtures thereof, or any of the aforementioned strong acids based on the anhydrous basis, to the raw clay may range from 4 parts to 20 by weight per 100 parts by weight of the raw clay. The acid mixture based on anhydrous basis may range from 1 to 10 parts by weight of sulfuric acid and from 10 to 1 parts by weight of either hydrochloric acid, phosphoric acid, nitric acid, etc. The mineral acid or strong organic acids employed per se should not be too dilute. In other words, the concentration of such acids should be between 40–95%. Anhydrous mineral acids such as 100% sulfuric acid can be effectively employed but are not quite as effective as acids of lower concentration.

After the mixture or suspension of the raw clay and the phenolic compound has been acidified, the resulting acid mixture is stirred and heated at a temperature ranging from ambient to 190° C. for a period of time ranging from ½ hour to about a maximum of 10 hours. The actual time required to complete the activation will depend upon the nature or character of the phenolic compound employed in the mixture. For example, if the phenolic compound is nonylphenol, the acid activation reaction takes place at about ambient temperature, i.e. about 25° C., with a shorter period of contact time.

After the raw clay has been acid activated, i.e., converted to a catalyst, the required alkylation is conducted in the conventional manner at a temperature ranging from 60° to 190° C. either by simultaneous addition of an alkene hydrocarbon of 2 to 18 carbon atoms and any one of the phenolic compounds with a position open for substitution, or an admixture thereof.

In the above operation, the method of addition may be altered by charging the catalyst admixture into either the phenol or the olefinic hydrocarbon, then adding the second component as the reaction proceeds. Conversely, there can be charged into the catalyst admixture either the phenol or olefinic hydrocarbon, again adding the second component at a controlled addition rate.

For a further and more specific understanding of the present invention, reference is given to the following illustrative examples. All parts given are by weight unless otherwise noted.

EXAMPLE I

Into a 2-liter 3-necked flask equipped with agitator and thermometer there were charged 150 parts of No. 49 Bentonite 200 mesh (obtained from Whittaker, Clark and Daniels) and 500 parts of nonylphenol. The mixture was stirred until uniform and then 34 parts of 78% sulfuric acid added with agitation. The mixture was stirred for 1 hour at room temperature (25° C.) and used immediately for the following reactions:

*Alkylation*

Into a 1-liter 4-necked flask equipped with agitator, thermometer and water-cooled reflux condenser there were charged 235 parts of phenol USP (2.5 M), 252 parts of nonene (2.0 M) and 23 parts of the catalyst mixture from Example I.

The mixture was heated at 90° C. with agitation for a period of 3 hours. The catalyst was removed by filtration. 425.0 parts of the filtrate was fractionated at 10 mm. pressure through a laboratory Vigreux column providing 17 theoretical plates to yield 365.2 parts of nonylphenol, in addition to that supplied by the catalyst mixture, distilling over the range 155° C. to 181° C. at 10 mm. and having refractive index $N_D^{25}$ of 1.5110. Yield: 95.5%.

*Polymerization*

400 parts of the catalyst from Example I were filtered on a Buchner funnel yielding about 140 parts of filter cake. The cake was then washed with three 200-part amounts of acetone to remove the nonylphenol. Yield: 101 parts dry catalyst.

Into a 2-liter 3-necked flask equipped with agitator, thermometer and water-cooled reflux condenser there were charged 400 parts of an isobutylene dimer (commercial octene) and 50 parts of the dry catalyst. The mixture was refluxed for a period of 6 hours. The following changes, indicative of polymerization, were noted:

|  | Initial | Final |
| --- | --- | --- |
| Viscosity (cps.) | 0.8068 | 4.750 |
| Iodine No. | 246.8 | 167.9 |
| Refractive Index ($N_D^{25}$) | 1.4088 | 1.4422 |

The principal component of the admixture was identified as an isobutylene tetramer.

EXAMPLE II

Into a 2-liter 3-necked flask equipped with agitator, thermometer, and condenser there were charged 150 parts of Aquagel (obtained from Baroid Div. of National Lead Co.), 400 parts of dodecylphenol, 27 parts of 78% sulfuric acid and 15 parts of concentrated hydrochloric acid. The mixture was stirred for 1 hour at 70° C. and used for the following reactions:

Alkylation A

Into a 1-liter 4-necked flask equipped with agitator, thermometer, and water-cooled condenser there were charged 117.5 parts of phenol USP (1.25 M) and 16 parts catalyst mixture from Example II. Into this mixture at 50° C. 168 parts of dodecene (1.0 M) were added over a period of 30 minutes. The mixture was heated at 60° with agitation for 4 hours. The filtrate was distilled to give dodecylphenol having a refractive index $N_D^{25}$ of 1.5070. Yield: 79.0%.

Alkylation B

Alkylation A was repeated with the exception that the 16 parts of the catalyst mixture was filtered to give about 6 parts of wet catalyst cake. This was then used with identical amounts of phenol and dodecene as in Alkylation A to give substantially the same yield of 79%.

EXAMPLE III

Into a 5-liter 3-necked flask equipped with agitator, thermometer, and condenser there were charged 10.0 parts of No. 49 Volclay Bentonite (obtained from Whittaker, Clark & Daniels) and 150 parts of melted phenol USP (at about 70°). While maintaining the temperature of 70° C., 3.0 parts of 78% sulfuric acid were added with agitation. The agitation was continued for 1 hour while maintaining the temperature at from 70° to 90° C. Immediately thereafter 1730 parts of phenol (20 M total) were added with agitation while maintaining the temperature at 90° C. Then over a period of 1 hour 2016 parts of nonene (16 M) were added at 90° C. The temperature was maintained at 90° C. for an additional 4 hours. The crude product was filtered and distilled to give nonylphenol. Yield: 92.5%.

EXAMPLE IV

Example III was repeated with the exception that the 150 parts and the 1730 parts, respectively of phenol were replaced by 150 and 2010 parts of orthocresol. The crude material was filtered and distilled to give nonylcresol. Yield: 90.8%.

EXAMPLE V

Into a 1-liter 4-necked flask equipped with agitator, thermometer, and water-cooled reflux condenser there were charged 252 parts of nonene (2.0 M), 235 parts of phenol USP (2.5 M), and 5 parts of a dry catalyst in powder form obtained under the brand name of KSF from Girdler Catalysts, Chemetron Corp.

The mixture was heated to 90° C. and maintained at this level for a period of 4 hours. The mixture was then filtered and distilled to yield nonylphenol, having a refractive index $N_N^{25}$ of 1.5110 and a hydroxyl number of 255. Yield: 31.0%.

EXAMPLE VI

Example V was repeated with the exception that the 5 parts of KSF dry catalyst were replaced by 5 parts of the dry catalyst of Example I under polymerization. The refractive index and hydroxyl number of the nonylphenol were unchanged. Yield: 96.8%.

EXAMPLE VII

Into a 5-liter 4-necked flask equipped with agitator, thermometer, dropping funnel and water-cooled condenser there were charged 200 parts of 2-naphthol and 40 parts of Wyoming Bentonite. The mixture was heated with agitation and held at 130° C. while 9.2 parts of 78% sulfuric acid were added. The mixture was stirred for ½ hour at 130° C. Then 1980 parts of melted 2-naphthol were added while maintaining the temperature at 130° C. over a period of 1 hour.

1750 parts of nonene were added at 130°–140° C. This temperature was maintained for an additional 2 hours. The mixture was filtered and the unreacted nonene and 2-naphthol removed by distillation. The remaining alkylation product had a refractive index $N_D^{25}$ of 1.5785. Yield: 92.1%.

EXAMPLE VIII

Into a 2-liter 4-necked flask equipped with agitator, thermometer, dropping funnel and water-cooled condenser there were charged 80 parts of phenol USP, 50 parts of nonene, 8 parts of Aquagel (obtained from Baroid Div. of National Lead Co.) and 1.7 parts of 78% sulfuric acid.

The mixture was heated at 80° C. for 1 hour, and then 390 parts of phenol USP (5.0 M total) added rapidly while maintaining the temperature at 80°–90° C. After a period of 1 hour the temperature was increased and maintained at 90°–100° C., and then 454 parts of nonene (4.0 M total) added with agitation. The temperature was maintained at 90°–100° C. for an additional period of 3 hours and the mixture then filtered. The filtrate was distilled to give nonylphenol having a refractive index of $N_D^{25}=1.5110$. Yield: 93.6%.

EXAMPLE IX

Example VIII was repeated with the exception that 50 parts and 622 parts of dodecene were substituted respectively for the 50 parts and 454 parts of nonene. Yield: 89.2%.

EXAMPLE X

Examples I and Alkylation A were repeated with the exception that 40 parts of trichloroacetic acid were substituted for the 34 parts of 78% sulfuric acid. The yield was basically unchanged.

EXAMPLE XI

Example I and Alkylation A were repeated with the exception that 40 parts of perchloric acid were substituted for the 34 parts of 78% sulfuric acid. The yield was basically unchanged.

EXAMPLE XII

Example I and Alkylation A were repeated with the exception that 40 parts of hydrochloric acid were substituted for the 34 parts of 78% sulfuric acid. The yield was approximately the same.

The acid activated catalysts, containing the phenolic compound, prepared in accordance with the present invention are particularly adaptable for continuous alkylation reactions while employing as the reaction vessel a long pipe or tube with two smaller inlet tubes, one on the right and one on the left. The alkylating mixture is directed to enter the pipe or tube from the left side. The mixture consists of melted phenol, nonene, and catalyst mixture prepared as above all of which are introduced into the vessel simultaneously and maintained at constant rates by appropriate metering devices. The residence time for this particular system is ½ hour, after which the product leaves the right side of the reaction vessel and is filtered through one or more filters which can be maintained without any shutdown periods.

Since the reaction is exothermic, a heat exchanging device can use the heat given off near the left end of the reaction tube or pipe to maintain a uniform temperature throughout the entire length of the tube or pipe and also to preheat the phenolic compound and alkene hydrocarbon, particularly the former.

The catalyst mixture can also be produced continuously, although this is not necessary since it can be conveniently produced in small repetitive batches.

Distillation can be carried out continuously in the conventional manner.

Recovered alkene hydrocarbon and phenolic compound are recycles to the left side of the reaction pipe or tube and reused.

The ratio of reactants to catalyst mixture and to each other is of course adjustable but is of the order of 1.0 mole by weight of alkene hydrocarbon per 1.25 mole by weight of phenolic compound per 9.0 parts by weight of catalyst mixture. The yield obtainable never goes below 95% while employing this continuous process.

I claim:

1. The process of preparing an acidic clay catalyst of the silica-alumina type which comprises contacting a mixture of 5 to 100 parts by weight of a raw clay of the silica-alumina type and 100 parts by weight of a phenol having from 6 to 25 carbon atoms and free from basic substituents in the presence of from 4 to 20 parts by weight of an acid selected from the class consisting of mineral acid, polyhaloacetic acid, benzene sulfonic and xylene disulfonic acid at a temperature ranging from ambient to 190° C.

2. The process of preparing an acidic clay catalyst of the silica-alumina type which comprises contacting a mixture of 100 parts by weight of a raw clay of the silica-alumina type and from 100 to 500 parts by weight of a phenol having from 6 to 25 carbon atoms and free from basic substituents in the presence of from 4 to 20 parts by weight of an acid selected from the class consisting of mineral acid, polyhaloacetic acid, benzene sulfonic and xylene disulfonic acid at a temperature ranging from ambient to 190° C.

3. The process according to claim 1 wherein the phenol is phenol.

4. The process according to claim 1 wherein the phenol is nonyl phenol.

5. The process according to claim 1 wherein the phenol is dodecyl phenol.

6. The process according to claim 1 wherein the phenol is o-cresol.

7. The process according to claim 1 wherein the phenol is 2-naphthol.

References Cited in the file of this patent

UNITED STATES PATENTS

| | | |
|---|---|---|
| 2,934,504 | Talvenheimo | Apr. 26, 1960 |
| 2,988,519 | Robinson et al. | June 13, 1961 |
| 3,014,079 | Olin | Dec. 19, 1961 |